United States Patent [19]
Rowlett

[11] 3,794,436
[45] Feb. 26, 1974

[54] MACHINE TOOL HAVING PLURAL INTERCHANGEABLE TRANSMISSIONS

[75] Inventor: Thomas H. Rowlett, Antioch, Ill.

[73] Assignee: Rowlar Manufacturing Co., Franklin Park, Ill.

[22] Filed: Oct. 27, 1971

[21] Appl. No.: 193,126

[52] U.S. Cl.............. 408/124, 408/42, 408/46, 74/665 GA, 10/130 R
[51] Int. Cl................. B23b 47/14, B23b 39/16
[58] Field of Search............. 408/124, 42, 46, 53; 74/665 GA; 10/130, 132

[56] References Cited
UNITED STATES PATENTS
1,721,268  7/1929  Bolin............................ 74/665 GA
1,958,552  5/1934  Thomas........................... 408/46

Primary Examiner—Francis S. Husar
Attorney, Agent, or Firm—George H. Gerstman

[57] ABSTRACT

A spindle-driving machine tool is provided which has a number of interchangeable gear boxes. The gear boxes are simultaneously operated by being coupled to a number of transmission output shafts. Each of the gear boxes has a number of hex takeoffs all rotating at the same speed, but at different speeds from the hex takeoffs of the other gear boxes. The hex takeoffs are connected through universal drive assemblies to conventional spindles.

2 Claims, 4 Drawing Figures

3,794,436

MACHINE TOOL HAVING PLURAL INTERCHANGEABLE TRANSMISSIONS

BACKGROUND OF THE INVENTION

The present invention concerns an improved spindle-driving machine tool of the type wherein a spindle-driving head is located above a worktable and is supported by upright means.

Prior art industrial spindle-driving machine tools often carry a number of spindles, each of which may be connected to a different tool for boring, tapping, drilling or milling. Such prior art multiple spindle machines have the disadvantage that all of the spindles are driven at the same speed. In order to operate in a production line, it is often necessary to utilize a number of adjacently positioned multiple spindle machines, each of which drives spindles at a different speed from the others, and the workpiece is conveyed from one multiple spindle machine to another.

Another type of prior art multiple spindle machine utilizes a number of removable and interchangeable tool heads, each of which contains gearing for providing a selected speed. Each tool head can be substituted for another tool head in a machine having a main tool head carrier. Such a machine is disclosed in U.S. Pat. No. 3,555,963, issued in the name of Donald J. Evans and assigned to General Electric Company. One of the drawbacks of the last-mentioned type of multiple spindle machine having a removable head is that each operation requiring a different speed tool requires that a different tool head be inserted into the single tool head carrier which is supported by the frame. Although the rapid substitution of removable tool heads may be advantageous and more efficient than the use of a plurality of machine tools each having its own spindle-driving speed, it is apparent that the time required to interchange tool heads may be detrimental to an efficient operation.

It is, therefore, an object of the present invention to provide a multiple spindle machine incorporating the advantages of both of the aforementioned prior art multiple spindle machines and obviating the disadvantages thereof.

An object of the present invention is to provide a multiple spindle machine including a plurality of interchangeable gear boxes each of which is adapted for driving a plurality of spindles.

It is a further object of the present invention to provide a multiple spindle machine in which a number of gear boxes are connected to a transmission having a single motor driven input and a plurality of output shafts, with each of the gear boxes providing a different spindle speed. In this manner, one of the gear boxes of the machine may operate high speed drills, while another of the gear boxes of the machine operates lower speed drills and another of the gear boxes of the machine operates very low speed taps. All of the boring, tapping, drilling and milling operations to be performed on the workpiece can thus be performed by a single machine without removing tool heads in order to obtain different speeds. For example, a particular hole in a workpiece can be both drilled (with a high speed drill) and tapped (with a low speed tap) utilizing a single machine and without removing and/or substituting any tool heads.

An additional object of the present invention is to provide a multiple spindle machine having the ability to drive a large number of spindles at many different speeds so that a single machine can be utilized to perform numerous different operations on a workpiece without the need to stop the machine during its operation on the workpiece in order to change gears or the like.

Other objects and advantages will become apparent from the following disclosure.

BRIEF DESCRIPTION OF THE INVENTION

In accordance with the present invention, there is provided a spindle-driving machine of the type wherein a spindle-driving means is located above a worktable and is supported by upright means. The improvement comprises a spindle-drive motor with transmission means coupled to the motor. The transmission means has a plurality of output shafts. A plurality of gear boxes, each of which has means for coupling the input of the gear box to one of the output shafts, is provided, with the plurality of gear boxes being simultaneously coupled to the transmission means. In the illustrative embodiment, each of the gear boxes includes a gear mechanism for providing an output having a selected speed, with at least one of the gear boxes having a gear mechanism to provide a greater speed output than another gear box. A plurality of takeoffs which face the worktable are located at the output side of each of the gear boxes.

In the illustrative embodiment, bolt means are provided for fastening the gear boxes to the transmission means, to permit simple disattachment of each of the gear boxes from the transmission means. Each of the gear boxes is identical in size and is interchangeable with another.

In the illustrative embodiment, all of the transmission output shafts are coupled through selected gearing to a common drive shaft, and means are provided for coupling the common drive shaft to the spindle-drive motor.

A more detailed explanation of the invention is provided in the following description and claims, and is illustrated in the accompanying drawing.

DETAILED DESCRIPTION OF THE ILLUSTRATIVE EMBODIMENT

Figure 1:
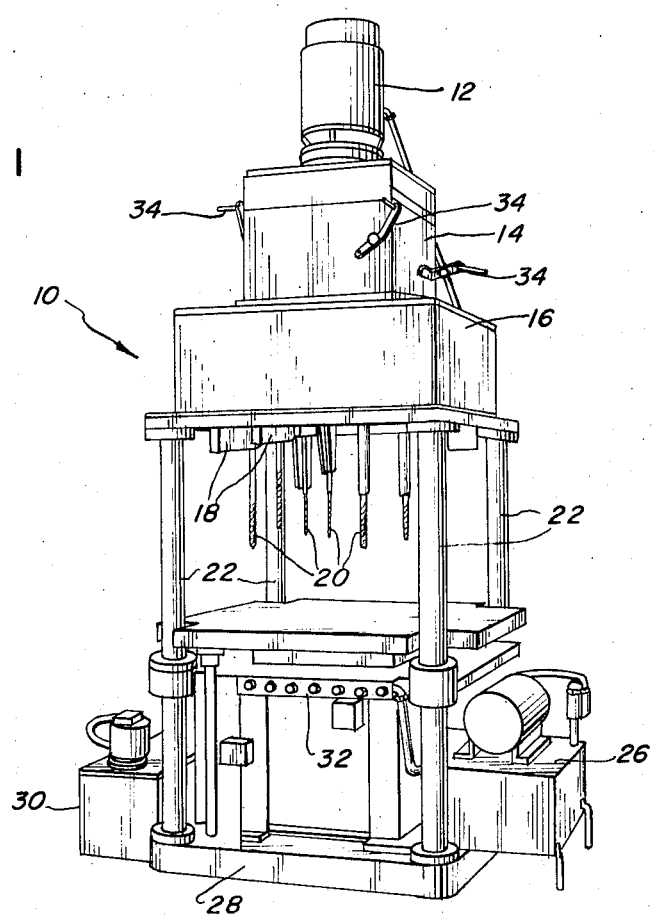
FIG. 1 is a perspective view of a spindle-driving machine tool constructed in accordance with the principles of the present invention.

Referring to FIG. 1, the machine tool 10 illustrated therein comprises a conventional spindle-driving motor 12 coaxially positioned with respect to transmission housing 14 having a square cross-sectional configuration, and also coaxially positioned with respect to gear box and spindle housing 16 (having a square cross-sectional configuration). A number of spindles 18 carrying drills 20 are connected through conventional universal drive assemblies (not shown) to hex takeoffs which extend from four interchangeable gear boxes, as will be discussed below.

The above-mentioned structure is supported by four uprights 22, and the spindle assemblies 18 overlie the worktable 24 which is driven vertically by means of hydraulic drive unit 26. The structure is supported by a base 28, includes a conventional cooling system 30 and is operated through a control panel 32 which is located relatively close to the worktable 24. In operation, the workpiece is held by a conventional holding mechanism which lies on worktable 24 and permits the workpiece to be moved and held in various positions with respect to the spindles. Spindles 18 could carry various types of tools, such as tools for boring, tapping, drilling or milling. The speeds of the tools driven by one of the four gear boxes is controlled by four speed shifting levers 34, each of which has a high, medium and low position with respect to controlling one of the gear boxes.

Figure 2:
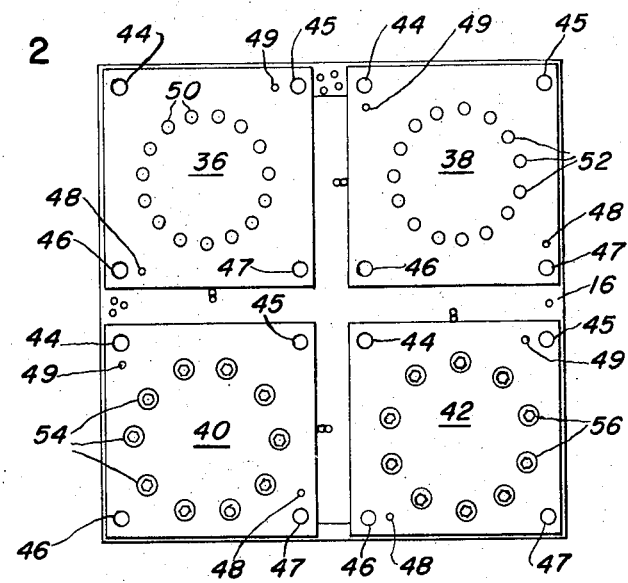
FIG. 2 is a bottom plan view of the gear boxes connected to the machine tool of FIG. 1.

Referring to FIG. 2, it is seen that four gear boxes 36, 38, 40 and 42 are provided. Each of the gear boxes is removably fastened to the transmission by means of four corner bolts 44, 45, 46 and 47 and is located in place with respect to the transmission by means of two locating pins 48 and 49.

Gear box 36 carries a number of circularly arranged hex takeoffs 50, gear box 38 carries a number of circularly arranged hex takeoffs 52, gear box 40 carries a number of circularly arranged hex takeoffs 54, and gear box 42 carries a number of circularly arranged hex takeoffs 56. The hex takeoffs from one gear box are a different size from the hex takeoffs of another gear box and all hex takeoffs are connectible to conventional universal drive assemblies which fasten to conventional spindles. The spindles have fastened thereto either drills or other suitable tools for boring, tapping or milling.

Figure 3:
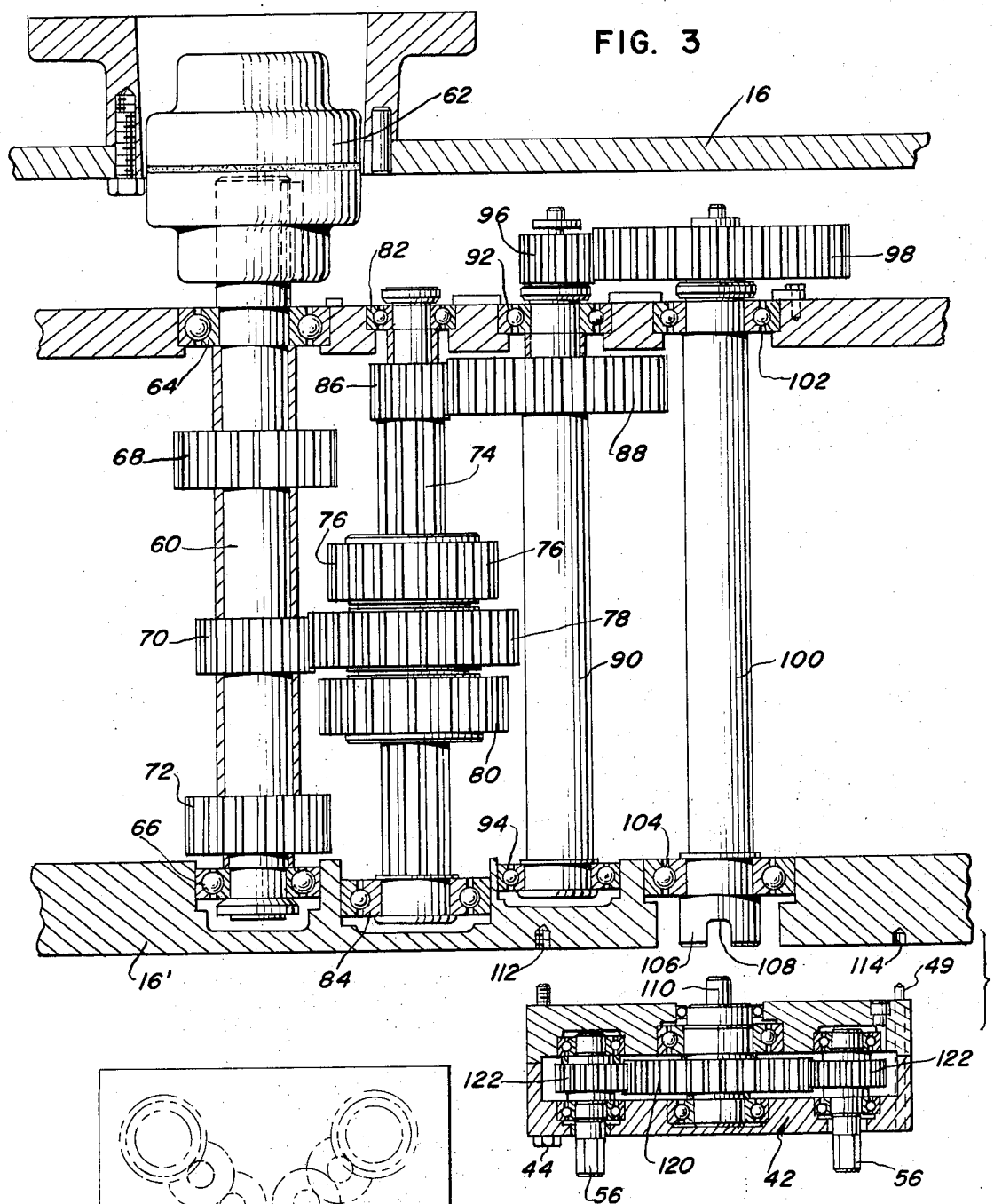
FIG. 3 is an enlarged, fragmentary view of one quadrant of the transmission of the machine tool of FIG. 1, with an exploded view of one of the gear boxes adapted for connection thereto, with portions of the transmission and gear box shown in section.
Figure 4:
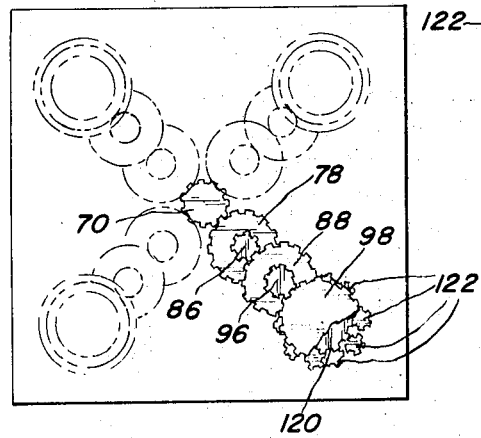
FIG. 4 is a diagrammatic bottom view of the transmission and gear box gearing in the machine of FIG. 1.

A quadrant of the transmission and gear box 42 is illustrated in FIG. 3. Referring to FIG. 3, it is seen that the transmission comprises a main motor drive shaft 60 which is coupled to motor 12 (shown in FIG. 1) through motor coupling 62. Shaft 60 is journaled within conventional ball bearings 64, 66 and carries medium speed gear 68, low speed gear 70 and high speed gear 72. Located adjacent main drive shaft 60 is a splined shaft 74 carrying internally splined gears 76, 78 and 80 which are ganged so as to move together axially with respect to shaft 74 and to rotate together with shaft 74. Conventional means (not shown) are utilized to move ganged gears 76, 78 and 80 along shaft 74 so that either (1) gear 76 will engage gear 68 to provide medium speed operation, or (2) gear 78 will engage gear 70 to provide low speed operation, or (3) gear 80 will engage gear 72 to provide high speed operation. Gear 70 is smaller in diameter than gears 68 and 72 and gear 78 is larger in diameter than gears 76 and 80 so that when ganged gears 76, 78 and 80 are raised or lowered, gears 76 and 80 can pass by gear 70 without engaging it. Shaft 74 is journaled within ball bearings 82 and 84.

The distance between gears 68 and 70 is equal to the distance between gears 70 and 72, and is greater than the width of two gears. In this manner, for example, when gear 76 engages gear 68, gears 78 and 80 lie between gears 68 and 70 and do not engage either of them.

A gear 86 is keyed to shaft 74 for engagement with speed reduction gear 88 keyed to shaft 90. Shaft 90 is journaled within ball bearings 92 and 94 and carries a gear 96 which engages speed reduction gear 98 keyed to shaft 100. Shaft 100 is journaled within bearings 102 and 104 and has a lower portion 106 which defines a recess 108 having a polygonal cross-sectional configuration. Recess 108 is adapted to receive an input shaft 110 (having a corresponding polygonal configuration) from gear box 42. Lower cover 16' of the transmission housing has defined therein threaded recesses 112 for threaded engagement with connecting bolts 44, 45, 46 and 47. Cover 16' also defines recesses 114 for insertion of locating pins 48 and 49 therein. It is to be understood that the gearing in each quadrant of the transmission may be modified so that the transmission output shafts 100 rotate at different speeds, if desired.

Gear box 42 includes a central gear 120 keyed to shaft 110 and a number of planetary gears 122, each of which is keyed to a hex takeoff 56. The gears of each gear box are different so that the hex takeoffs of one gear box turn at a different speed than the hex takeoffs of the other gear boxes. Gear box 42 can be fastened to cover 16' by inserting locating pins 48 and 49 into appropriate recesses 114 while shaft 110 is inserted into recess 108, and bolts 44, 45, 46 and 47 are then screwed into cover 16' to complete the fastening of the gear box to the transmission.

It can be seen that there is provided a number of rapidly interchangeable gear boxes, each of which carries a plurality of hex takeoffs which rotate at a speed that is different from the hex takeoffs of the other gear boxes. In this manner, among other things, a hole can be both drilled and tapped utilizing the same machine without interchanging heads. For example, a drill coupled to a hex takeoff 50 which is rotating at a high speed could be utilized to drill a hole and the same hole could be tapped by a tap coupled to a hex takeoff 56 which is rotating at a much slower speed. The speeds of the takeoffs of each gear box can be controlled by moving the ganged gears corresponding to gears 76, 78 and 80 so that they engage with one of gears 68, 70 and 72 of main drive shaft 60.

Although an illustrative embodiment of the invention has been shown and described, it is to be understood that various modifications and substitutions may be made by those skilled in the art without departing from the novel spirit and scope of the present invention. For example, if desired, more or less than four gear boxes could be utilized and the transmission gearing and the gear box gearing can be varied considerably so as to obtain a desired speed. Further, if desired, the transmission and gear box systems could be moved vertically with respect to a stationary worktable, although a movable worktable, as illustrated in the drawing, is preferred.

I claim:
1. In a spindle-driving machine tool of the type wherein spindle-driving means is located above a worktable and is supported by upright means, the improvement comprising, in combination: a spindle-drive motor; transmission means coupled to said motor and having a plurality of output shafts, all of said transmission output shafts being coupled through selected gearing to a common drive shaft, means coupling said common drive shaft to said spindle-drive motor, said common drive shaft carrying a plurality of gears and each of said output shafts being coupled through gearing to a first shaft having a plurality of gears, each of which gears is selectively directly engageable with one of the gears carried by said common drive shaft, at least one of the gears carried by said common drive shaft having a different diameter from another and at least one of the gears carried by said first shaft having a different diameter from another to permit movement of the gears carried by said first shaft with respect to said common drive shaft without any gear carried by said common drive shaft impeding movement of said first shaft's gears; a plurality of gear boxes each of which has means for coupling the input of said gear box to one of said output shafts whereby said plurality of gear boxes can be simultaneously coupled to said transmission means, each of said gear boxes including a gear mechanism for providing an output having a selected speed; and a plurality of takeoffs located at the output side of each said gear box and facing said worktable.

2. In a spindle-driving machine tool of the type wherein spindle-driving means is located above a worktable and is supported by upright means, and including a spindle drive motor, transmission means coupled to the motor and having a plurality of output shafts, and a transmission housing for enclosing said transmission means, the improvement comprising, in combination: a plurality of gear boxes, each of said gear boxes
  a. being enclosed in its own gear box housing,
  b. having means for coupling the input of said gear box to one of said output shafts whereby said plurality of gear boxes can be simultaneously coupled to said transmission means,
  c. being interchangeable with another,
  d. including a gear mechanism for providing an output having a selected speed,
  e. having a plurality of takeoffs at its output side facing said worktable, and
  f. having an attached device for cooperating with fastening means, to permit simple attachment and disattachment of said gear box to said transmission means, and means for providing rapid fastening of said gear boxes to said transmission means;

all of said transmission output shafts being coupled to a common drive shaft carrying a plurality of gears; means coupling said common drive shaft to said spindle-drive motor; each of said output shafts being coupled through gearing to a first shaft having a plurality of gears, each of which gears is selectively directly engageable with one of the gears carried by said common drive shaft.

* * * * *